United States Patent
Priel et al.

(10) Patent No.: US 8,248,743 B2
(45) Date of Patent: Aug. 21, 2012

(54) DEVICE HAVING FAILURE RECOVERY CAPABILITIES AND A METHOD FOR FAILURE RECOVERY

(75) Inventors: Michael Priel, Hertzelia (IL); Dan Kuzmin, Givat Shmuel (IL); Cor Voorwinden, Toulouse (NL)

(73) Assignee: Freescale Semiconductor, Inc., Austin, TX (US)

( * ) Notice: Subject to any disclaimer, the term of this patent is extended or adjusted under 35 U.S.C. 154(b) by 450 days.

(21) Appl. No.: 11/816,037

(22) PCT Filed: Feb. 16, 2005

(86) PCT No.: PCT/IB2005/000384
§ 371 (c)(1),
(2), (4) Date: Apr. 3, 2008

(87) PCT Pub. No.: WO2006/087596
PCT Pub. Date: Aug. 24, 2006

(65) Prior Publication Data
US 2009/0027819 A1    Jan. 29, 2009

(51) Int. Cl.
*H02H 3/38* (2006.01)
(52) U.S. Cl. .......................................................... 361/79
(58) Field of Classification Search .................... 361/79
See application file for complete search history.

(56) References Cited

U.S. PATENT DOCUMENTS

| | | | | |
|---|---|---|---|---|
| 4,342,953 A * | 8/1982 | Collins | .......................... | 320/136 |
| 4,635,178 A * | 1/1987 | Greenhalgh | ..................... | 363/65 |
| 4,713,553 A * | 12/1987 | Townsend et al. | .............. | 307/64 |
| 5,739,596 A | 4/1998 | Takizawa et al. | | |
| 6,058,320 A | 5/2000 | Yokota | | |
| 6,233,128 B1 * | 5/2001 | Spencer et al. | .................. | 361/86 |
| 6,314,307 B1 | 11/2001 | Charron | | |
| 6,483,684 B2 * | 11/2002 | Isobe | ........................... | 361/93.9 |
| 2003/0034792 A1 | 2/2003 | Ostrom et al. | | |
| 2003/0216766 A1 * | 11/2003 | Wiener et al. | .................. | 606/169 |
| 2005/0051535 A1 * | 3/2005 | Flagg et al. | .................... | 219/517 |

FOREIGN PATENT DOCUMENTS

GB  2335569 A   9/1999
WO  0219074 A2  3/2002

\* cited by examiner

*Primary Examiner* — Rexford Barnie
*Assistant Examiner* — Ann Hoang

(57) ABSTRACT

A device that has failure recovery capabilities and a method for power recovery. The method includes: detecting a potential power failure in response to a decrement rate of a supply voltage, and applying at least one failure recovery measure in response to a detected potential power failure. The device includes: a power source, an energy reservoir, at least one component, and a power failure circuit, adapted to detect a potential power failure in response to a decrement rate of a supply voltage.

20 Claims, 2 Drawing Sheets

DEVICE HAVING FAILURE RECOVERY CAPABILITIES AND A METHOD FOR FAILURE RECOVERY

FIELD OF THE INVENTION

The present invention relates to devices and methods for failure recovery and especially for recovering from short power failures.

BACKGROUND OF THE INVENTION

Battery operated devices, such as cellular phones, radios, MP3 players, personal data appliances, pagers and small sized computers, may suffer from short power failures. The short power failures can occur for various reasons, including but not limited to a relative movement between the battery and its connectors.

Short power failures can cause a device to enter a unknown state, to lose previously stored information, to lose synchronization with other devices, and the like.

In order to reduce, minimize or even to eliminate the negative effects of short power failures prior art device monitored the level of the supply voltage. Once the supply voltage was below a certain threshold a failure recovery sequence was applied.

Typically a power source such as a battery is connected to a power reservoir. A typical power reservoir includes a capacitor.

The power reservoir is charged by the battery and provides supply voltage to various components of the device during short power failures. Typically, due to size and cost limitations, the power reservoir can supply power for a relatively short period.

The following patents, which are incorporated herein by reference, describe failure recovery devices and methods that detect a power failure by comparing the level of the supply voltage to a fixed low voltage threshold: U.S. Pat. No. 6,226,556 of Itkin et al., U.S. Pat. No. 5,739,596 of Yasutoshi et al., and GB patent 2335569A1 of Rushinek et al.

The low voltage threshold is set above a power failure level. Once the supply voltage reaches the power failure level the device ceases to operate and is actually shut down.

The low voltage threshold has to be set at a certain distance above the power failure level such as to facilitate a completion of a power failure detection and recovery measure sequence such as storing critical information in an SDRAM or shutting down non-vital components.

On the other hand, in order to allow prolonged operation of the device the low voltage threshold power has to be relatively low.

There is a need to provide efficient methods and devices for failure recovery.

SUMMARY OF THE PRESENT INVENTION

A method and a device for failure recovery, as described in the accompanying claims.

BRIEF DESCRIPTION OF THE DRAWINGS

The present invention will be understood and appreciated more fully from the following detailed description taken in conjunction with the drawings in, which.

DETAILED DESCRIPTION OF PREFERRED EMBODIMENTS

The following figures illustrate exemplary embodiments of the invention. They are not intended to limit the scope of the invention but rather assist in understanding some of the embodiments of the invention. It is further noted that all the figures are out of scale.

Figure 1:
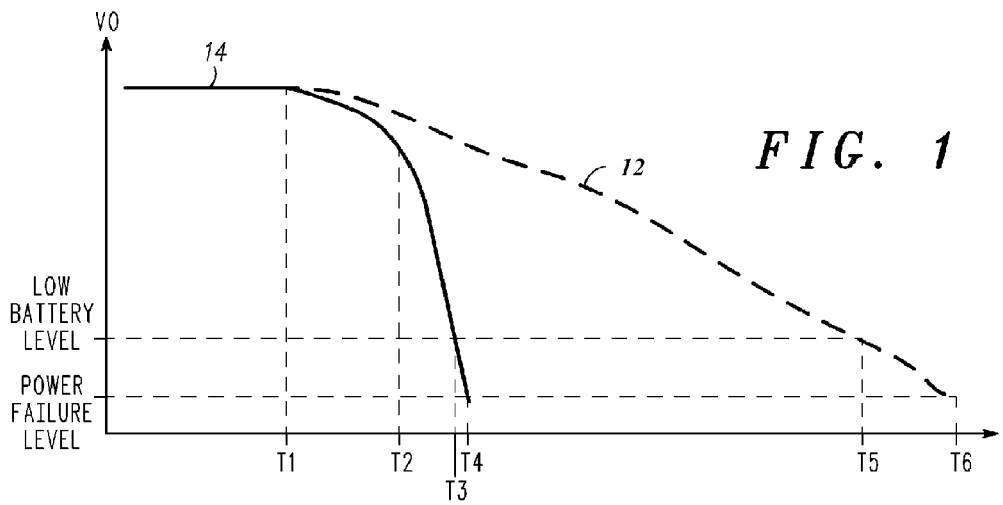
FIG. 1 illustrates a power failure.

FIG. 1 illustrates a power failure as well as a power source discharge sequence. The supply voltage behavior during a power failure is illustrated by a continuous curve 14 while the supply voltage behavior during a power discharge sequence is illustrated by dashed curve 12.

It is noted that for simplicity of explanation the beginning of a power failure was illustrated while a possible end of the power failure was not shown. If the power failure does not end within a relatively short period the power reservoir will not be able to provide adequate supply voltage to the components of the device and the device will be shut down.

Figure 2:
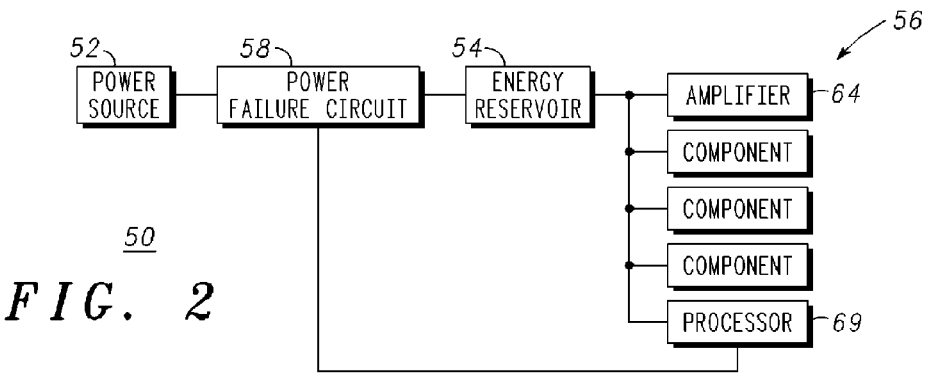
FIG. 2 is a schematic illustration of a device according to an embodiment of the invention.

Between T0 and T1 a supply voltage of V0 is supplied to one or more components of a device, such as device of FIG. 2. It is assumed, for convenience of explanation only, that V0 is the highest supply voltage that can be supplied from the power source. For example, during the relatively long power source discharge sequence the device can operate properly when receiving supply voltages that are lower than V0.

Referring to the dashed curve 12, the relatively long power source discharge sequence starts at T0, and ends at T7. At T7 the supply voltage reaches the power failure level.

Referring to the continuous curve 14 that illustrates an exemplary supply voltage behavior during a power failure. The inventors found out that a power failure is characterized by a rapid supply voltage decrement.

FIG. 1 illustrates a power failure events in which the supply voltage decrease at a medium rate (between T1 and T2) and then decreases at a high rate (between T2 and T4) until it reaches a power failure level. It is noted that a power failure can be characterized by another behavior of the supply voltage.

The inventors found out that by tracking the rate of the decrement of the supply voltage a potential power failure can be detected. The detection can occur at supply voltage level that are much higher than the power failure level. Thus, the device has more time for completing a power failure sequence.

FIG. 1 also illustrates a low battery level. When the supply voltage reaches the low battery level the device can generate an audio and/or visual indication. The user of the device can then recharge the power source. The dashed curve 12 crosses the low battery level at T5 while the continuous curve 14 crosses that level at T3.

According to an embodiment of the invention, one or more failure recovery measures are applied only if they can be completed before the supply voltage is below a certain level. This certain level can be the low battery level, the power failure level or another level.

FIG. 2 is a schematic illustration of a device 50 according to an embodiment of the invention. It is assumed, for convenience of explanation, that the device 50 includes a power source 52 that is connected to an energy reservoir 54.

The device 50 is conveniently a mobile device such as but not limited to a cellular phone, a radio, an MP3 player, a personal data appliance, a pagers or a small sized computer.

The energy reservoir 54 receives energy from power source 52 and supplies power when a power failure occurs. The voltage provided by the energy reservoir is referred to as a supply voltage. It is noted that the supply voltage can also be defined, for example, as the voltage that is supplied by the power source, the voltage at an intermediate point between the power source 52 and the energy reservoir 54, and the like.

The energy reservoir 54 is connected, either directly or indirectly, to many components (collectively denoted 56) of the device 50. Some of these components receive the supply voltage while others receive a fraction of said supply voltage. At least one of these components, such as amplifier 64, can affect the supply voltage.

At least one component (out of components 56) is connected to the power failure circuit 58, such as to allow the latter to apply one or more failure recovery measures. For example, such as component can be an SDRAM or a switch that can shut down non vital components during power failures. Such a component can also be a processor 69 that can control one or more failure recovery measures. Processor 69 can also contribute to the failure recovery measures in other manners, such as entering a low power consuming mode. It is noted that the processor 69 can be a part of the power failure circuit 58.

The amplifier 64 is usually locates in a transmission section of device 50.

The components (collectively denoted 56) can be categorized to vital and non-vital components, such as to allow the activation of vital components during short power failures while shutting down the non-vital components.

The device 50 also includes a power failure circuit 58 that in turn can include a power failure detection circuit 60 and a failure recovery circuit 62. The power failure circuit 58 monitors at least the supply voltage and determines if a possible power failure occurs.

The failure recovery circuit 62 can initiate or control at least one failure recovery measure such as but not limited to shutting down one or more components, storing certain information at a memory unit such as a SDRAM, altering to operational mode of one or more the components and the like. The alteration of the operational mode can include reducing the clock frequency, reducing the complexity of certain operations (such as filters, codec), reducing a transmission rate and even reducing the power or bit rate of transmitted signals.

It is noted that the power failure circuit 58 can include hardware components, software components or a combination of both. It is further noted that the power failure circuit 58 can consist of a single hardware component but can also include multiple hardware components.

According to an embodiment of the invention the power failure circuit 58 includes a processor 69 that is capable of performing or controlling one or more failure recovery measures. Conveniently, the processor can also perform other tasks.

An ideal power source can maintain the level of a supply voltage regardless of the current drained from it. On the other hand, the supply voltage provided by a non-ideal power source is responsive to the current drained from the source. The relationship between the supply voltage and the drained current is usually responsive to the finite resistance of the non-ideal power source. This relationship can also be affected by the characteristics of the connectors and conductors that electrically connect the power supply to the power reservoir and to other components of the device.

Usually, the behavior (such as activation, deactivation, or operation at a certain mode) of high-power consuming components, can substantially affect the supply voltage. It is noted that low or medium power consuming components also affect the supply voltage.

Figure 3:
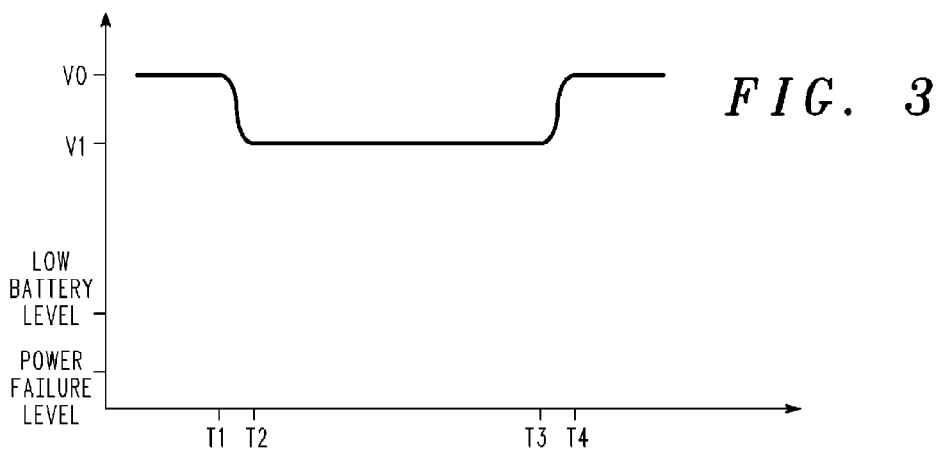
FIG. 3 illustrates a supply voltage change as a result of an activation of an amplifier.

FIG. 3 illustrates changes in a supply voltage resulting from an activation and a deactivation of an amplifier 64. Curve 18 illustrates the supply voltage behavior. Before the amplifier 64 is activated the supply voltage is maintained at a first voltage level such as V0. Once amplifier 64 is activated (at T1) the supply voltage gradually decreases (between T1 and T2) to a lower level V1. The supply voltage returns to V0 (between T3 and T4) after the amplifier 60 is shut down (at T3). The inventor used a circuit in which the difference (V1−V0) was about 300 mV.

According to an embodiment of the invention the power failure circuit 58 is adapted to ignore supply voltage changes that occur as a result of changes in the current that is drained by the components of device 50. For example, the power failure circuit 58 can ignore supply voltage changes that are smaller than or equal to V0−V1.

According to an embodiment of the invention the power consumption of various components and the relationship between their power consumption and the supply voltage is estimated and the power failure circuit 58 is updated accordingly. For example, the power consumption of amplifier 64 and its affect on the supply voltage can be estimated and in response the power failure circuit 58 can ignore supply voltage differences that correspond to this estimated power consumption.

According to another embodiment of the invention the power consumption of various components of device 50 and optionally their affect on the supply voltage is measured and the power failure circuit 58 is updated accordingly The update can include providing these measurements (or information representative of these measurements) to the power failure circuit, altering the power failure detection algorithm, and the like.

The power failure circuit 58 can receive an indication about the power consumption of one or more components of device 50, or the overall power consumption of device 50. It is noted that the indication can reflect a measured power consumption, or merely an indication about the status of one or more components. The status can indicate when the components is activated, when it is deactivated and even in which operational mode the components operates.

For example, the power failure circuit 58 can receive an indication that amplifier 64 is being activated and determine the presence of a power failure in response to an estimated supply voltage change resulting from the activation of amplifier 64.

According to another embodiment of the invention the power failure circuit 58 can measure the power consumption of one or more components of device 50. Conveniently, the power consumption can be measured by measuring one or more currents, one or more voltages and the like.

According to various embodiments of the invention the monitoring of various parameters of device 50, including level of supply voltage, is executed in one of the following manners or in a combination of two or more of the following: a discrete manner, in a continuous manner, according to a predefined measurement pattern or randomly or quasi-randomly. In either case the power failure detection circuit 58 should be able to detect relative fast power decrements.

It is noted that the power failure detection can be based upon two consecutive measurements, but this is not necessarily so. Various algorithms, including statistical algorithms, can be applied on two or more measurements in order to detect power failure.

According to an embodiment of the invention a sampling rate of the supply voltage is responsive to the supply voltage level. For example, at higher supply voltage values lower sampling rates can be applied.

Figure 4:
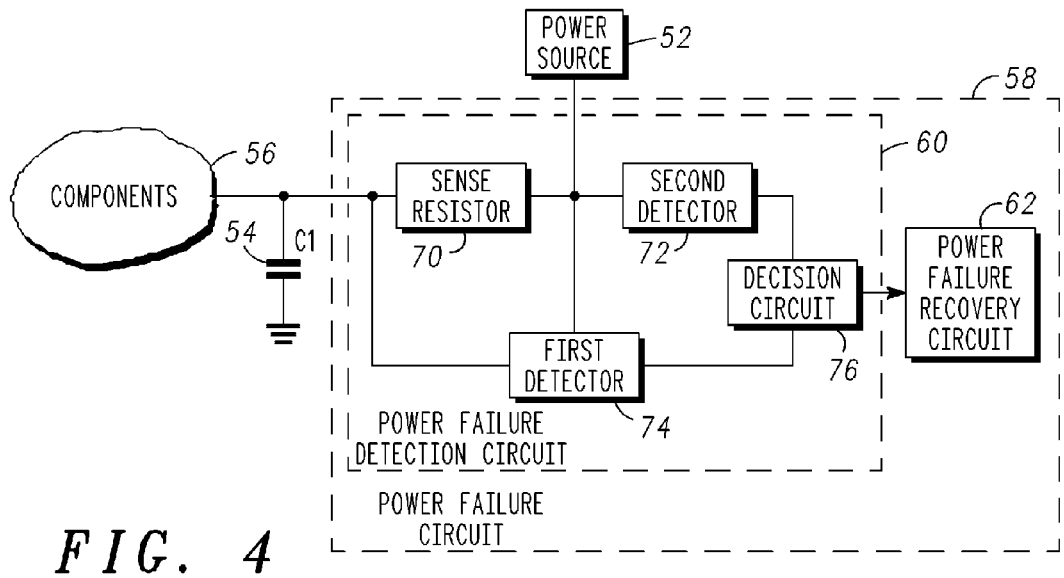
FIG. 4 is a schematic illustration of a power failure circuit and its environment, according to an embodiment of the invention.

FIG. 4 is a schematic illustration of a power failure circuit 58 and its environment, according to an embodiment of the invention.

The environment includes components 56 (illustrated by cloud 56), a power reservoir such as capacitor C1 54 and power source 52. The power source 52 can be represented by an ideal power source that is connected to a pair of serially connected resistors. A first resistor represents the resistance of the power source and the other resistor represents the battery contact resistance.

Power failure circuit 58 includes a power failure detection circuit 60 and a failure recovery circuit 62. The power failure detection circuit 60 includes a sense resistor 70 that has a first end and a second end. The first end of sense resistor 70 is connected to the power source 52. The second end of sense resistor 70 is connected to a first end of capacitor C1 54. The other end of C1 is grounded. The first end of C1 is also connected to components 56.

A first detector 72 is connected in parallel to the sense resistor 70 and measures the voltage V over the sense resistor 70. V is proportional to the current I that passes through the sense resistor 70. I is substantially the current that is drained by components 56. As the resistance R of the sense resistor 70 is known, first detector 72 (or decision circuit 76) can extract the current I. Mathematically, I=V/R.

A second detector 74 is connected to the first end of the sense resistor 70 and determines the supply voltage change rate. The supply voltage change rate is proportional to the differences between supply voltage measurements and is inversely proportional to differences between the timing of these measurements. It is noted that this voltage differs by V from the voltage supplied by C1 54 but its change represents changes in the supply voltage.

Mathematically, dV/dT=(V(m2)−V(m1))/(T(m2)−T(m1)), whereas dV/Dt is the supply voltage change rate during a time period that started at T(m1) and ended at T(m2), V(m1) is the measured supply voltage at T(m1) and V(m2) is the measured supply voltage at T(m2).

It is noted that each both sensors 74 and 72 can be combined, but this is not necessarily so.

According to various embodiments of the invention these detectors can be digital circuits, analog circuits or a combination of both. An analog detector can include an analog circuit that is characterized by a certain bandwidth that corresponds to certain voltage change rate. Once the voltage changes more rapidly this analog circuit can output an error signal representative of the difference between the certain voltage rate and the actual voltage change rate.

Figure 5:
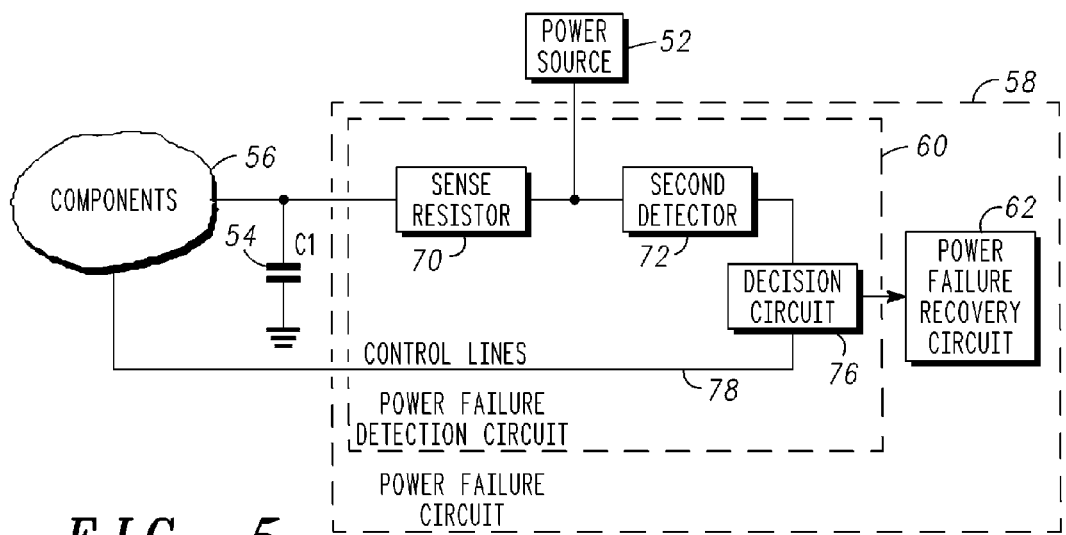
FIG. 5 is a schematic illustration of a power failure circuit and its environment, according to another embodiment of the invention.

The two detectors 72 and 74 are connected to a decision circuit 76 that determines whether a potential power failure occurs. The decision circuit 76 can compare the supply voltage change rate to the changes in the current that is drained by components 56 and determine if a power failure occurs. FIG. 5 is a schematic illustration of a power failure circuit 58' and its environment, according to another embodiment of the invention.

The power failure circuit 58', and especially the power failure detection circuit 60' do not include the first detector 72, but rather receives indications about the status of various components of device 50 over control lines 78. The decision circuit 76 receives these indications as well as signals from second detector 74 and determines whether a power failure occurs.

It is noted that the decision circuit 76 can be a part of components 56. For example, the decision circuit can be, for example, a code that is executed by processor 69. The processor 69 is connected to detectors 72 and 74, either directly or via another component such as but not limited to an interrupt controller.

It is further noted that the detectors 72 and 74, the decision circuit 76 and the failure recovery circuit 62 receive the supply voltage or a fraction of that voltage.

Figure 6:
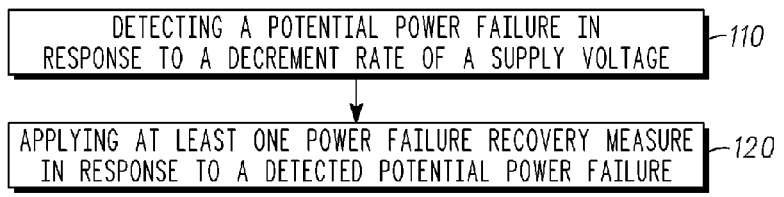
FIG. 6 is a flow chart of a method for failure recovery, according to an embodiment of the invention.

FIG. 6 is a flow chart of method 100 for failure recovery, according to an embodiment of the invention.

Method 100 starts by stage 110 of detecting a potential power failure in response to a decrement rate of a supply voltage.

Conveniently, the detection is further responsive to an activity of at least one component that affects the supply voltage. For example, the decision circuit 76 can ignore supply voltage changes that occur due to an activation of amplifier 64.

According to an embodiment of the invention the detection is responsive to an estimated power consumption of at least one component that affects the supply voltage. Referring to the example set forth in FIG. 5, the status of various components can be provided to a decision circuit 76 that in turn determines whether a change in the supply voltage occurred as a response to a change in status of a component of a device.

According to an embodiment of the invention the detection is further responsive to an increment rate of current consumed by at least one components that affects the supply voltage. For example, if the supply voltage decreases at a rate that is substantially similar to the increment rate of current consumed by components 56 than the method does not detect a power failure.

Conveniently, the detection is further responsive to an estimated increment rate of current consumed by at least one components that affects the supply voltage.

According to an embodiment of the invention the detection is further responsive to a level of supply voltage. For example, if the supply voltage reaches a certain level, such as a low battery level, the power failure detection can be halted.

According to an embodiment of the invention the detection is responsive to a ratio between supply voltage change and current consumed by at least one component coupled to the supply voltage.

According to an embodiment of the invention the detection is further responsive to a supply voltage change. Conveniently, the detection includes ignoring supply voltage changes that are below a predefined voltage change threshold.

Stage 110 is followed by stage 120 of applying at least one failure recovery measure in response to a detected potential power failure.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for power recovery, the method comprises:
   detecting a potential power failure based on a comparison of a decrement rate of a supply voltage to changes in current consumed by at least one component of a device; and
   applying a failure recovery measure in response to the detected potential power failure during which a power source fails to supply power.

2. The method of claim 1, wherein applying the failure recovery measure comprises applying the failure recovery measure in response to determining the failure recovery measure can be completed before the supply voltage is below a threshold level.

3. The method of claim 1 wherein detecting the potential power failure comprises detecting the potential power failure based on a power failure algorithm, and further comprising altering the power failure algorithm based on the decrement rate of the supply voltage.

4. The method of claim 1 wherein the comparison of the decrement rate of the supply voltage to the changes in the current consumed by at least one component of the device comprises a comparison of the decrement rate of the supply voltage to an increment rate of the current consumed by the at least one component of the device.

5. The method of claim 1 wherein the comparison of the decrement rate of the supply voltage to the changes in the current consumed by at least one component of the device comprises a comparison of the decrement rate of the supply voltage to an estimated increment rate of the current consumed by the at least one component of the device.

6. The method of claim 1 wherein the detecting is further responsive to a level of the supply voltage;
   wherein the detecting the potential power failure occurs at a supply voltage level that is higher than a power failure level.

7. The method of claim 1 wherein the comparison of the decrement rate of the supply voltage to the changes in the current consumed by at least one component of the device comprises determining a ratio between a supply voltage change and between current consumed by at least one component coupled to the supply voltage.

8. The method of claim 1 wherein the detecting is further responsive to a supply voltage change.

9. The method of claim 1 wherein the detecting comprises ignoring supply voltage changes that are below a predefined voltage change threshold.

10. The method of claim 1 wherein the detecting comprises measuring a voltage over a sense resistor coupled between a battery and a power reservoir.

11. A device comprising: a power source; an energy reservoir, coupled to the power source and at least one component coupled to the energy reservoir; and a power failure circuit, adapted to detect a potential power failure during which a power source fails to supply power, based on a comparison of a decrement rate of a supply voltage to changes in current consumed by at least one component of the device.

12. The device of claim 11 wherein the power failure circuit is adapted to apply a failure recovery measure in response to determining the failure recovery measure can be completed before the supply voltage is below a threshold level.

13. The device of claim 11 wherein the power failure circuit is adapted to detect a potential power failure in response to an estimated power consumption of at least one component that affects the supply voltage.

14. The device of claim 11 wherein the power failure circuit is adapted to detect the potential power failure based on the comparison of the decrement rate of the supply voltage to an increment rate of the current consumed by at least one component of the device.

15. The device of claim 11 wherein the power failure circuit is adapted to detect the potential power failure in response to an estimated increment rate of the current consumed by the component of the device.

16. The device of claim 11 wherein the power failure circuit is adapted to detect the potential power failure in response to a level of the supply voltage at a supply voltage level that is higher than a power failure level.

17. The device of claim 11 wherein the power failure circuit is adapted to detect the potential power failure based on a ratio between a supply voltage change and the current consumed by at least one component of the device.

18. The device of claim 11 wherein the power failure circuit is adapted to detect the potential power failure in response to a supply voltage change.

19. The device of claim 11 wherein the power failure circuit is adapted to ignore supply voltage changes that are below a predefined voltage change threshold.

20. The device of claim 11, wherein the power failure circuit is adapted to change a power failure detection algorithm based on the decrement rate of the supply voltage.

* * * * *